United States Patent
Gilchrist, III et al.

(10) Patent No.: US 9,297,306 B2
(45) Date of Patent: Mar. 29, 2016

(54) EXHAUST GAS RECIRCULATION SYSTEM, TURBOMACHINE SYSTEM HAVING THE EXHAUST GAS RECIRCULATION SYSTEM AND EXHAUST GAS RECIRCULATION CONTROL METHOD

(75) Inventors: George Martin Gilchrist, III, Greenville, SC (US); Stanley Frank Simpson, Simpsonville, SC (US); Hasan Karim, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 1754 days.

(21) Appl. No.: 12/208,728

(22) Filed: Sep. 11, 2008

(65) Prior Publication Data
US 2010/0058758 A1 Mar. 11, 2010

(51) Int. Cl.
 F02C 3/34 (2006.01)
 F02C 1/08 (2006.01)
 F02C 7/08 (2006.01)
 F02C 9/40 (2006.01)

(52) U.S. Cl.
 CPC ... F02C 3/34 (2013.01); F02C 1/08 (2013.01); F02C 7/08 (2013.01); F02C 9/40 (2013.01)

(58) Field of Classification Search
 CPC ............... F02C 3/34; F02C 1/08; F02C 7/08; F02C 9/40
 USPC ................................. 60/39.52, 39.17, 39.281
 See application file for complete search history.

(56) References Cited

U.S. PATENT DOCUMENTS

| | | |
|---|---|---|
| 3,685,287 A | 8/1972 | Dooley |
| 3,949,548 A | 4/1976 | Lockwood, Jr. |
| 4,267,692 A | 5/1981 | Earnest |
| 4,271,664 A * | 6/1981 | Earnest ..................... 60/39.181 |
| 4,313,300 A | 2/1982 | Wilkes et al. |
| 4,533,314 A | 8/1985 | Herberling |
| 4,561,245 A | 12/1985 | Ball |
| 4,566,267 A | 1/1986 | Miller et al. |
| 4,827,714 A | 5/1989 | Miles |
| 5,064,357 A | 11/1991 | Smith |

(Continued)

FOREIGN PATENT DOCUMENTS

EP 1731883 A1 12/2006

OTHER PUBLICATIONS

Qingguo Zhang, et al., GT2005-68907, Characterization of Fuel Composition Effects in H2/CO/CH4 Mixtures Upon Lean Blowout, ASME/IGTI Turbo Expo 2005, Jun. 6-9, 2005, pp. 1-13.

(Continued)

Primary Examiner — Phutthiwat Wongwian
Assistant Examiner — Michael B Mantyla
(74) Attorney, Agent, or Firm — Ernest G. Cusick; Frank A. Landgraff

(57) ABSTRACT

An exhaust gas recirculation system that includes an exhaust gas recirculation regulator operatively connectable to a turbomachine system, and regulating a predetermined amount of exhaust gas to be recirculated. The exhaust gas recirculation system further includes a measuring unit that measures fuel composition of incoming fuel, and a control unit connected to the EGR regulator and the measuring unit, and determining a Wobbe Index and/or reactivity of the incoming fuel based on the measured fuel composition and determining the predetermined amount of exhaust gas to be recirculated based on the determined Wobbe Index and/or reactivity.

20 Claims, 7 Drawing Sheets

(56) References Cited

U.S. PATENT DOCUMENTS

| | | | |
|---|---|---|---|
| 5,165,606 A | 11/1992 | Pelet | |
| 5,220,781 A | 6/1993 | Keller | |
| 5,282,354 A | 2/1994 | Keller | |
| 5,284,013 A | 2/1994 | Keller | |
| 5,361,576 A | 11/1994 | Muller | |
| 5,400,587 A | 3/1995 | Keller et al. | |
| 5,426,932 A | 6/1995 | Morihara et al. | |
| 5,557,919 A | 9/1996 | Althaus | |
| 5,577,378 A | 11/1996 | Althaus et al. | |
| 5,584,182 A | 12/1996 | Althaus et al. | |
| 5,674,066 A | 10/1997 | Hausermann et al. | |
| 5,794,431 A | 8/1998 | Utamura et al. | |
| 5,881,549 A | 3/1999 | Janes | |
| 5,896,736 A * | 4/1999 | Rajamani | 60/773 |
| 6,079,197 A | 6/2000 | Attia | |
| 6,082,093 A | 7/2000 | Greenwood et al. | |
| 6,532,745 B1 * | 3/2003 | Neary | 60/784 |
| 6,619,026 B2 | 9/2003 | Carelli et al. | |
| 6,691,503 B2 | 2/2004 | Tiemann | |
| 6,691,519 B2 | 2/2004 | Little | |
| 6,817,187 B2 | 11/2004 | Yu | |
| 6,886,344 B2 * | 5/2005 | Frutschi et al. | 60/772 |
| 6,945,052 B2 * | 9/2005 | Frutschi et al. | 60/772 |
| 6,981,358 B2 | 1/2006 | Bellucci et al. | |
| 7,124,589 B2 * | 10/2006 | Neary | 60/784 |
| 7,980,082 B2 * | 7/2011 | Ziminsky et al. | 60/780 |
| 8,484,981 B2 * | 7/2013 | Nag | F02C 9/40 60/39.27 |
| 2006/0046218 A1 * | 3/2006 | Joklik et al. | 431/75 |
| 2007/0033918 A1 * | 2/2007 | Benz et al. | 60/39.12 |

OTHER PUBLICATIONS

J. Natarajan, et al., GT2005-68917, Laminar Flame Speeds of Synthetic Gas Fuel Mixtures, ASME Turbo Expo 2005, Jun. 6-9, 2005, pp. 1-10.

Qingguo Zhang, et al, Characterization of Fuel Composition Effects in H2/CO/CH4 Mixtures Upon Lean Blowout, Transaction of the ASME, vol. 129, Jul. 2007, pp. 688-694.

U.S. Appl. No. 12/133,065, filed Jun. 4, 2008, Title: "Turbine System Having Exhaust Gas Recirculation and Reheat".

* cited by examiner

EXHAUST GAS RECIRCULATION SYSTEM, TURBOMACHINE SYSTEM HAVING THE EXHAUST GAS RECIRCULATION SYSTEM AND EXHAUST GAS RECIRCULATION CONTROL METHOD

BACKGROUND OF THE INVENTION

This invention relates to an exhaust gas recirculation (EGR) system that reduces thermal nitrogen oxides (NOx). More particularly, this invention relates to an EGR system that reduces thermal NOx by varying a level of EGR based on a Wobbe index and/or reactivity of incoming fuel, a turbomachine system having the EGR system and an EGR control method.

EGR can be used to alter and control the production of thermal NOx. In a typical EGR system, exhaust gas is recirculated from a turbine towards an air inlet portion of the system. The quantity of exhaust gas to be recirculated may increase as a load of a generator of the system lowers. Therefore, it is necessary to regulate the amount of exhaust gas to be recirculated, to thereby enable the temperature of a combustor of the system to remain constant.

Several methods for controlling thermally generated NOx in EGR systems have been used. One method uses a diluent such as water or steam to reduce the flame temperature and limit NOx. Another method controls the EGR flow rate based on turbine loading information, to thereby minimize NOx emissions. In the latter disclosed method, the amount of exhaust gas recirculated to the compressor may be controlled based on the load of the generator, the rate of the flow of fuel to the combustor and the load demand of an external system powered by the generator, for example.

There are a number of different types of fuels that can be used in a turbomachine system. Each fuel type has a different Wobbe Index and reactivity. Therefore, the use of different types of fuels in the turbomachine system may change the temperature of the combustion process. There is a need for an EGR system that can vary the amount of EGR based on the Wobbe Index and/or reactivity of incoming fuel to the turbomachine system, to thereby permit continuous turbomachine operation during times of fluctuation in the type of fuel being used.

BRIEF DESCRIPTION OF THE INVENTION

An exemplary embodiment of the present invention provides an EGR system that includes an EGR regulator operatively connectable to a turbomachine system and regulating a predetermined amount of exhaust gas to be recirculated. The EGR system further includes a measuring unit that measures fuel composition of incoming fuel, and a control unit connected to the EGR regulator and the measuring unit, and determining a Wobbe Index and/or reactivity of the incoming fuel based on the measured fuel composition and determining the predetermined amount of exhaust gas to be recirculated based on the determined Wobbe Index and/or reactivity.

Additional exemplary embodiments of the present invention provide a turbomachine system having EGR system and an EGR control method.

Additional features and advantages are realized through the techniques of exemplary embodiments of the invention. Other embodiments and aspects of the invention are described in detail herein and are considered a part of the claimed invention. For a better understanding of the invention with advantages and features thereof, refer to the description and to the drawings.

DETAILED DESCRIPTION

Figure 1:
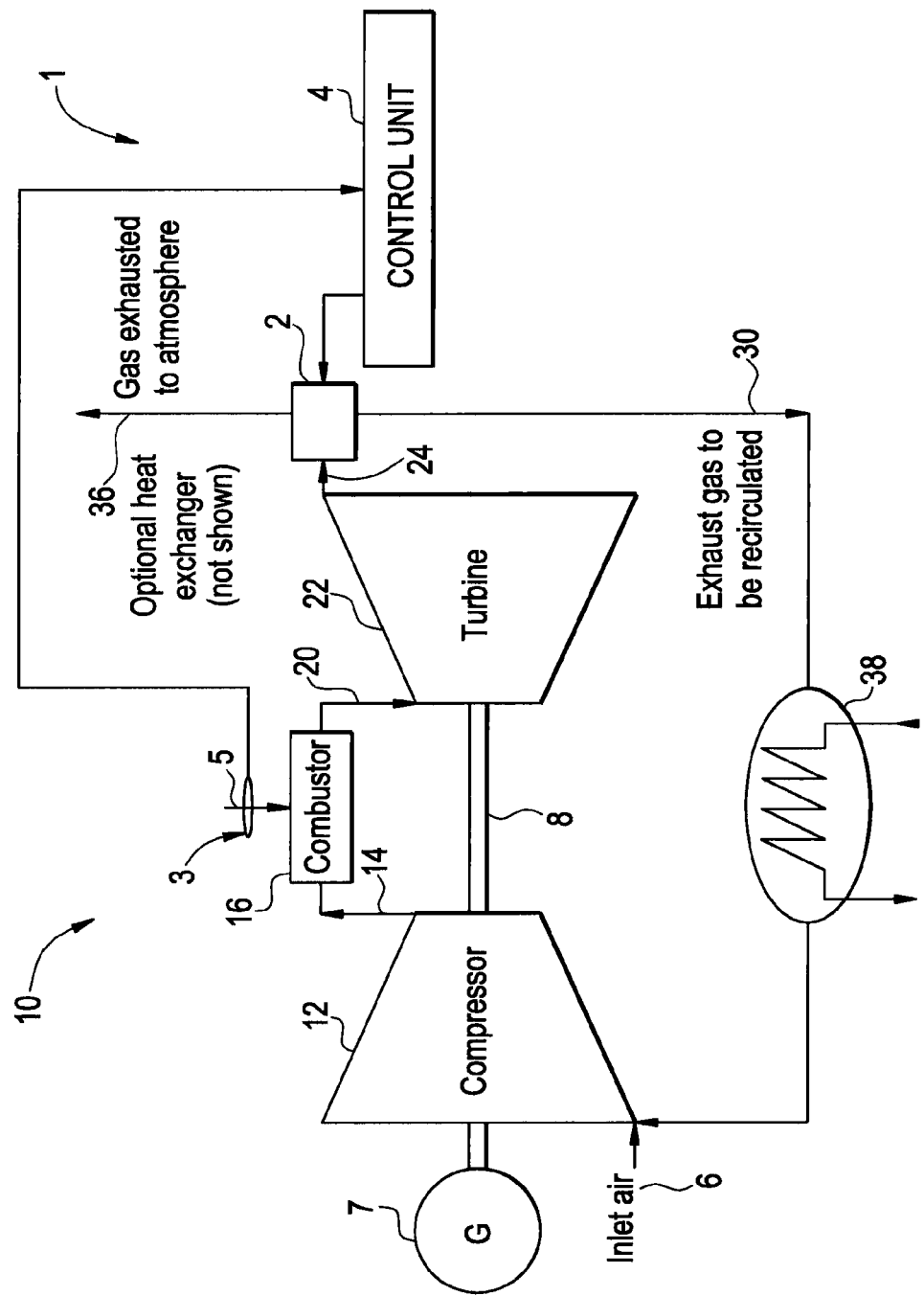
FIG. 1 is a block diagram of a single shaft turbomachine system having an EGR system that can be implemented within embodiments of the present invention.

Turning now to the drawings in greater detail, it will be seen that in FIG. 1, an EGR system 1 according to an exemplary embodiment of the present invention. The EGR system 1 is operatively connectable to a turbomachine system 10. The EGR system 1 includes an EGR regulator 2 that is operatively connectable to the turbomachine system 10. The EGR regulator 2 regulates a predetermined amount of exhaust gas 30 to be recirculated in the turbomachine system 10. According to an exemplary embodiment, the EGR regulator 2 may be a valve or a damper, however, the present invention is not limited hereto and any suitable control mechanism may be used.

The EGR system 1 further includes a measuring unit 3 to measure fuel composition of incoming fuel 5. According to an embodiment, the measuring unit 3 may be a sensor or a gas chromatograph, however, the present invention is not limited hereto and any suitable measuring device may be used.

The EGR system 1 further includes a control unit 4 that is operatively connected to the EGR regulator 2 and the measuring unit 3. The control unit 4 receives the measured fuel composition from the measuring unit 3 and determines a Wobbe Index and/or reactivity of the incoming fuel based on the fuel composition and determines the predetermined amount of exhaust gas 30 to be recirculated based on the determined Wobbe index and/or reactivity of the incoming fuel 5. According to embodiments of the present invention, the reactivity of the incoming fuel may be evaluated based on at least one of laminar flame speed ($S_L$), flammability limits, and chemical time, however, the present invention is not limited hereto, and other factors may be used to determine the reactivity of the incoming fuel such as cycle pressure and cycle temperature, for example. Laminar flame speed may be calculated through the use of predetermined analytical expression (based on experimental data), for example. Further, chemical time may be calculated based on laminar premixed flame thickness and flame-speed and is given by $$\left(\frac{\alpha}{S_L^2}\right)$$

(where α denotes the thermal diffusivity), for example, however other methods of calculating chemical time may be used. Once the control unit 4 determines the Wobbe Index and/or the reactivity, the control unit 4 then controls the EGR regulator 2 to recirculate the predetermined amount of exhaust gas 30 based on the determined Wobbe Index and/or reactivity of the incoming fuel 5.

According to one exemplary embodiment, the control unit 4 includes a database, for example, storing information regarding predetermined exhaust gas recirculation amounts for specified Wobbe indices of fuel. The control unit 4 selects a predetermined amount of exhaust gas 30 to be recirculated based on the determined Wobbe index of the incoming fuel 5. According to the present invention, the database may be a lookup table (LUT), for example, however, the present invention is not limited to a database and any suitable information tool may be used. According to another exemplary embodiment, the control unit 4 may receive the Wobbe index information from an external device (not shown). In addition, the control unit 4 may be located in a centralized location or locally with respect to the turbomachine system 10.

According to another exemplary embodiment, the control unit 4 also obtains turbine loading information of the turbomachine system 10, and controls the EGR regulator 2 based on the determined Wobbe index and the turbine loading information obtained. The turbine loading information is based on a load of the turbomachine system 10. According to an exemplary embodiment, the turbine loading information may be obtained in any suitable manner.

According to another exemplary embodiment, the control unit determines the reactivity of the incoming fuel 5 based on at least one of the flame speed, flammability limits and the chemical time of the incoming fuel 5, and determines the predetermined amount of exhaust gas 30 to be recirculated based on the determined reactivity. The predetermined amount of exhaust gas 30 varies dependent upon the reactivity of the incoming fuel. The predetermined amount of exhaust gas 30 may be between approximately 20% to approximately 70%, preferably, 30% to 50% of exhaust gas from a turbine 22 (as depicted in FIG. 1, for example). For example, if the reactivity of the incoming fuel 5 is low then the amount of exhaust gas 30 may be approximately 32%, for example, and if the reactivity of the incoming fuel 5 is high then the amount of exhaust gas 30 may be approximately 50%.

According to another exemplary embodiment, the measuring unit 3 measures fuel composition for the incoming fuel 5 in real-time, and transmits the measured fuel composition to the control unit 4. Then, the control unit 4 determines the Wobbe Index and/or reactivity of the incoming fuel 5 based on the measured fuel composition and controls the EGR regulator 2 by varying an EGR flow rate in real-time based on the determined Wobbe Index and/or reactivity. According to an exemplary embodiment, the EGR flow rate may be considered the rate and quantity of recirculated exhaust gas 30.

When the Wobbe index of the incoming fuel 5 is measured and the control unit 4 determines that the heating value of the fuel 5 is greater than that of existing fuel of the turbomachine system 10, the predetermined amount of exhaust gas 30 is increased to reduce the amount of thermal NOx produced. Further, when the control unit 4 determines that the heating value of the fuel has decreased, the amount of exhaust gas 30 is decreased to a value that maintains the thermal NOx below a predetermined limit. On the other hand, when the control unit 4 determines that there is no change in the heating value of the fuel, the predetermined amount of exhaust gas 30 remains constant.

Further, as shown in FIG. 1, the turbomachine system 10 according to the current exemplary embodiment, includes a generator 7, a compressor 12, a combustor 16 that receives the incoming fuel 5, a turbine 22 that is operatively connected to the combustor 16, and the EGR system 1. The generator 7 is rotatably connected to the compressor 12 and the turbine 22 via a single shaft 8. The compressor 12 sucks inlet air 6 and compresses the air. The compressed air 14 is sent to a combustor 16 that mixes the compressed air 14 with incoming fuel 5 and burns the mixture to produce combustion gases 20. The combustion gases 20 are then fed to the turbine 22, and used to drive the turbine 22. Further, the turbine 22 drives the generator 7. The generator 7 is operated at a constant rotational speed so that the quantity of inlet air 6 remains constant.

According to an exemplary embodiment, the EGR regulator 2 receives exhaust gases 24 from the turbine 22. The measuring unit 3 measures fuel composition of the incoming fuel 5 at the combustor 16, and the control unit 4 determines a Wobbe Index and/or reactivity of the incoming fuel 5 based on the measured fuel composition and determines the predetermined amount of exhaust gas 30 to be recirculated based on the determined Wobbe Index and/or reactivity. The control unit 4 then controls the EGR regulator 2 to direct the predetermined amount of exhaust gas 30 from the turbine 22 to the compressor 12. As shown in FIG. 1, remaining exhaust gas 36 of the exhaust gases 24 is exhausted to the atmosphere. According to an exemplary embodiment, the remaining exhaust gas 36 may be exhausted via a heat exchanger (not shown). FIG. 1 also illustrates the compressed air 14 being provided to the combustor 16 separately from the incoming fuel 5.

Further, as shown in FIG. 1, the recirculated predetermined amount of exhaust gas 30 is introduced into the compressor 12 with the inlet air 6. According to an exemplary embodiment, the recirculated predetermined amount of exhaust gas 30 may be cooled by a heat exchanger 38 prior to being introduced into the compressor 12.

FIGS. 2 through 6 illustrate alternative exemplary embodiments of the present invention. Some of the features shown in FIGS. 2 through 6 are the same as those shown in FIG. 1 therefore, a detailed description of these features has been omitted.

Figure 2:
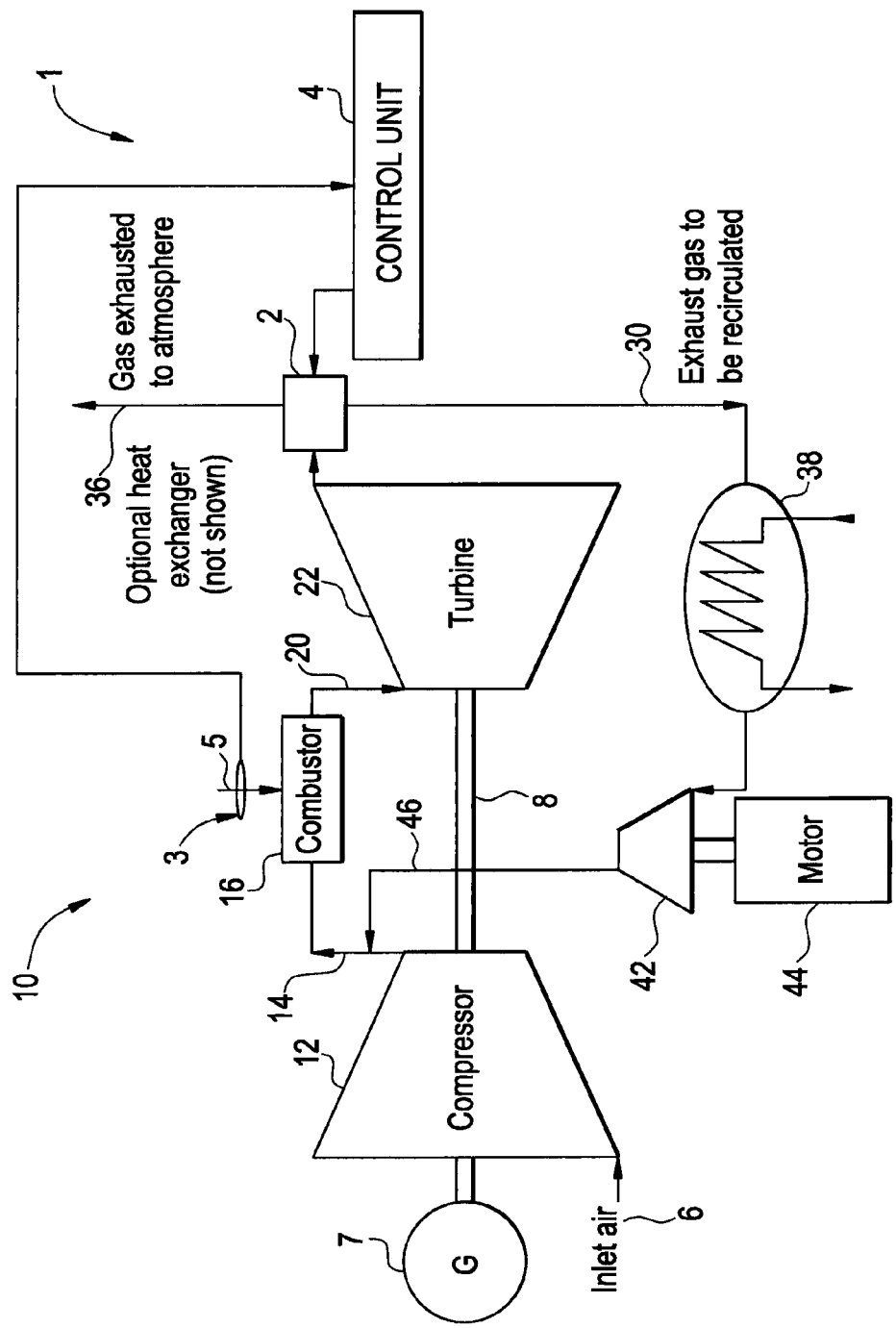
FIG. 2 is a block diagram of a single shaft turbomachine system having an EGR system that can be implemented within alternative embodiments of the present invention.

As shown in FIG. 2, the turbomachine system 10 further includes a compressor 42 and a motor 44. The recirculated exhaust gas 30 is cooled by the heat exchanger 38 and then fed into the compressor 42 driven by a motor 44, for example. Compressed recirculated exhaust gas 46 is then mixed with compressed gas 14 from the compressor 12 at the output of the compressor 12, prior to being introduced into the combustor 16. In another exemplary embodiment, the compressed recirculated exhaust gas 46 may be adjusted in terms of pressure at any stage of the compressor 12 or at its output, prior to being introduced into the combustor 16. That is, the compressed recirculated exhaust gas 46 maybe fed directly into the compressor 12, for example.

Figure 3:
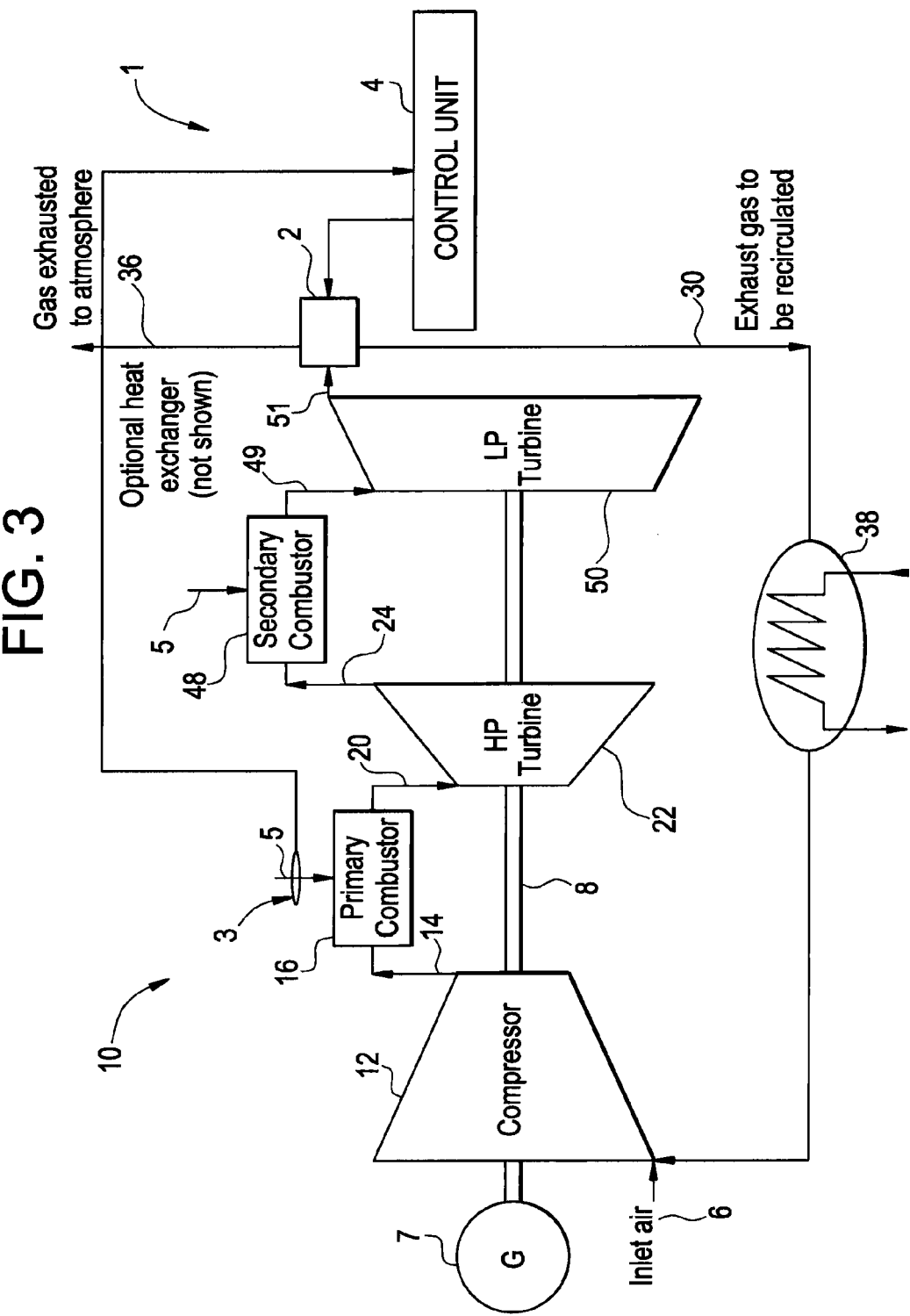
FIG. 3 is a block diagram of a reheat single shaft turbomachine system having an EGR system that can be implemented within embodiments of the present invention.

FIG. 3 illustrates a reheat turbomachine system according to an exemplary embodiment of the present invention. As shown in FIG. 3, the turbomachine system 10 further includes two combustors, i.e., the primary combustor 16 and a secondary combustor 48 and a turbine 50. The secondary combustor 48 mixes exhaust gas 24 from the turbine 22 with fuel 5 and burns the mixture to produce combustion gases 49. The burned mixture drives the turbine 50, and exhaust gas 51 from the turbine 50 is sent to the EGR regulator 2 to be regulated. In the current exemplary embodiment, the turbine 22 includes a high pressure turbine and the turbine 50 includes a low pressure turbine. Further, as shown in FIG. 3, the single shaft 8 rotatably connects the generator 7, the compressor 12, the turbine 22 and the turbine 50. According to the current exemplary embodiment, the measuring unit 3 only measures the incoming fuel 5 at the primary combustor 16 however the present invention is not limited hereto. Additional embodiments of the measuring unit 3 will now be described with reference to FIGS. 4 and 5.

Figure 4:
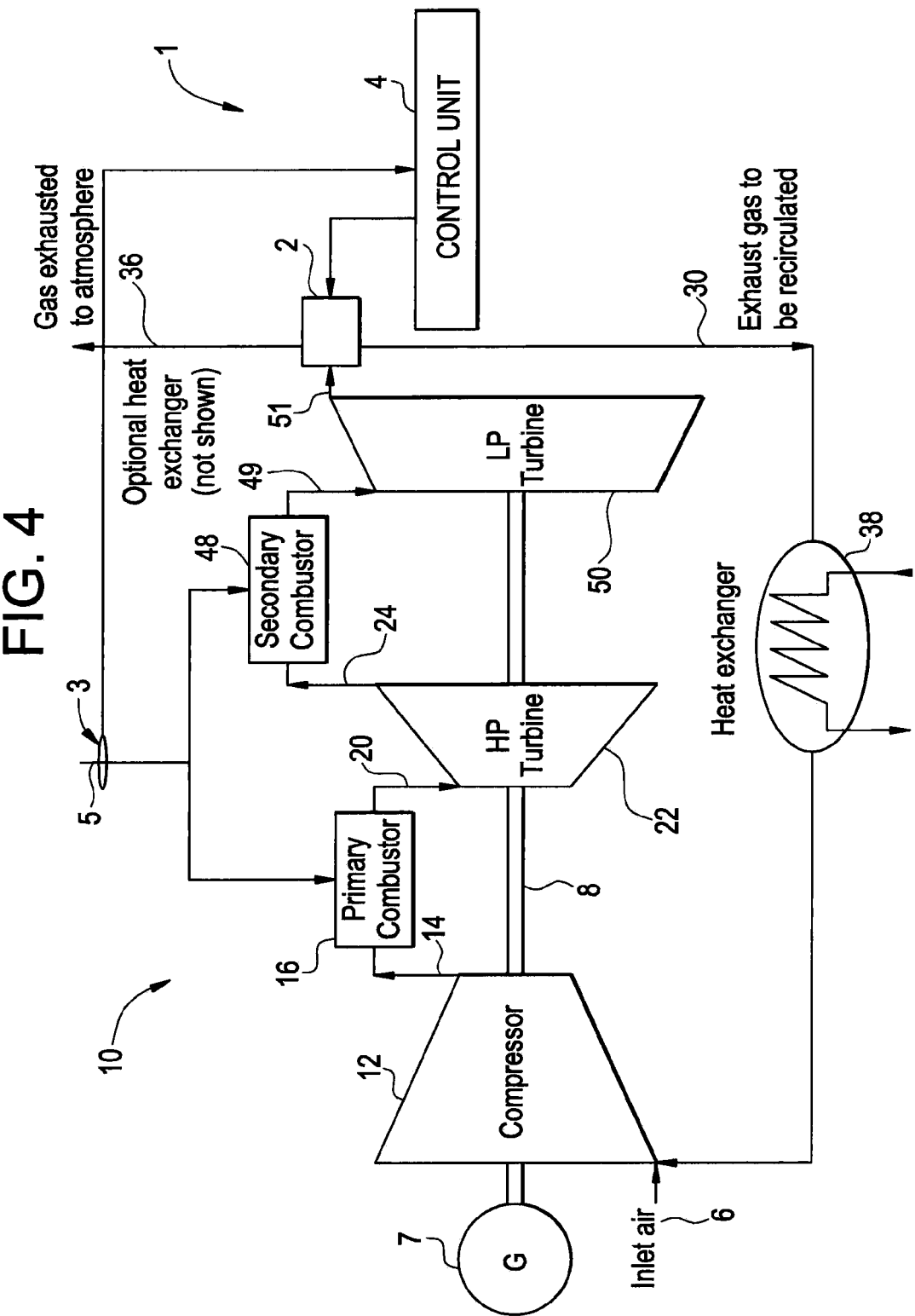
FIG. 4 is a block diagram of a reheat single shaft turbomachine system having an EGR system that can be implemented within alternative embodiments of the present invention.
Figure 5:
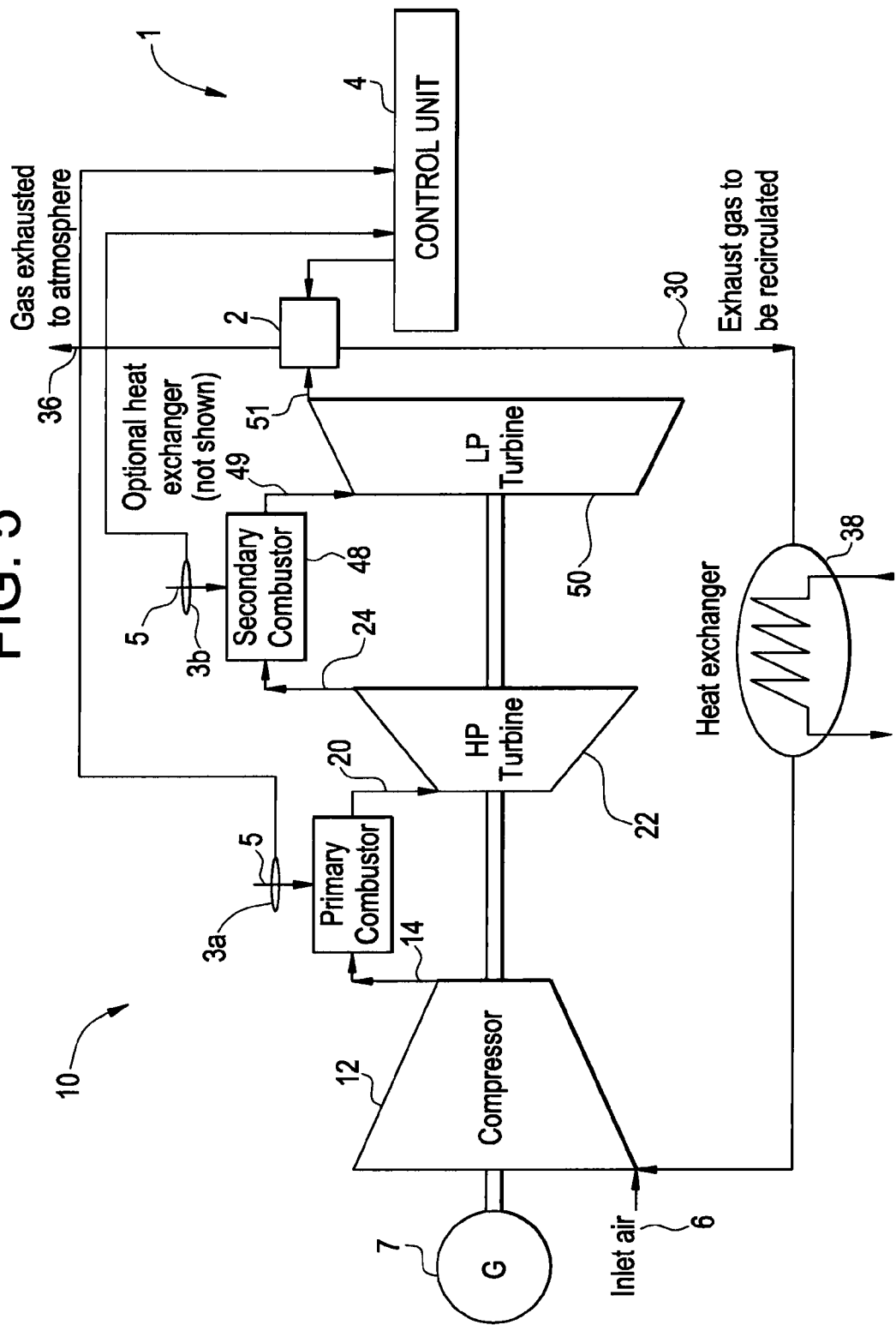
FIG. 5 is a block diagram of a reheat single shaft turbomachine system having an EGR system that can be implemented within alternative embodiments of the present invention.

FIGS. 4 and 5 illustrate reheat turbomachine systems according to additional exemplary embodiments of the present invention. As shown in FIG. 4, a single measuring unit 3 measures fuel composition of the incoming fuel 5 at both the primary combustor 16 and the secondary combustor 48. Alternatively, as shown in FIG. 5, the EGR system 1 includes a plurality of measuring units 3 including a first measuring unit 3a and a second measuring unit 3b. In the current exemplary embodiment, fuel composition of the incoming fuel 5 at the primary combustor 16 is measured by the first measuring unit 3a and fuel composition of the incoming fuel 5 at the secondary combustor 48 is measured by the second measuring unit 3b, and the fuel composition measured by each measuring unit 3a and 3b is sent to the control unit 4 to be processed.

Figure 6:
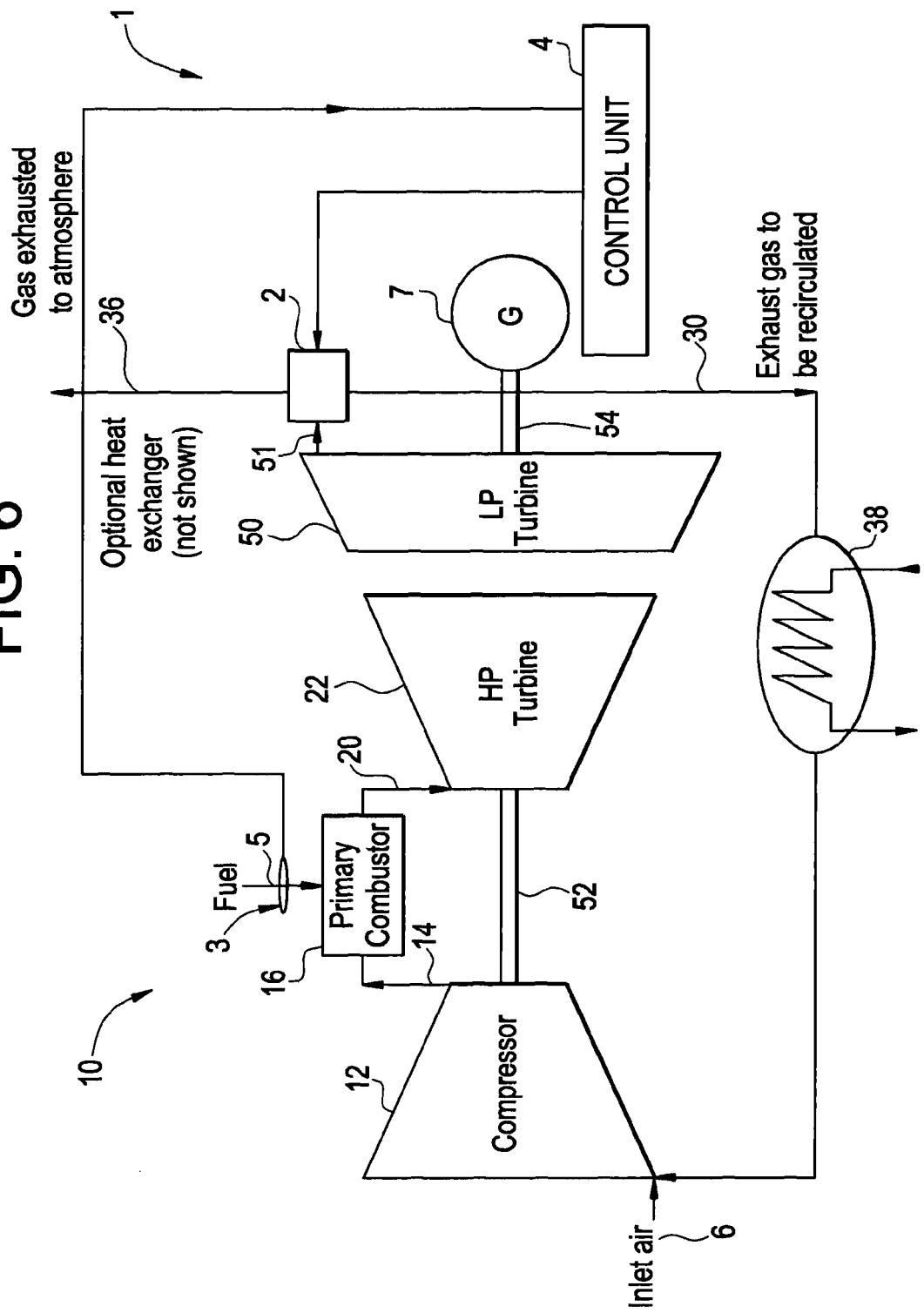
FIG. 6 is a block diagram of a dual shaft turbomachine system having an EGR system that can be implemented within embodiments of the present invention.

FIG. 6 illustrates a dual shaft turbomachine system having an EGR system according to an exemplary embodiment of the present invention. As shown in FIG. 6, the turbomachine system 10 includes a dual shaft having first and second shafts 52 and 54. The first shaft 52 rotatably connects the compressor 12 and the turbine 16, and a second shaft 54 rotatably connects the turbine 50 and the generator 7. The turbine 22 drives the compressor 12, and gases immediately exiting the turbine 22 drive the turbine 50. In the current exemplary embodiment, the turbine 50 drives the generator 7. According to another exemplary embodiment, the turbomachine system 10 may include a secondary combustor (not shown) between the turbine 22 and the turbine 50 to perform a reheat operation.

Figure 7:
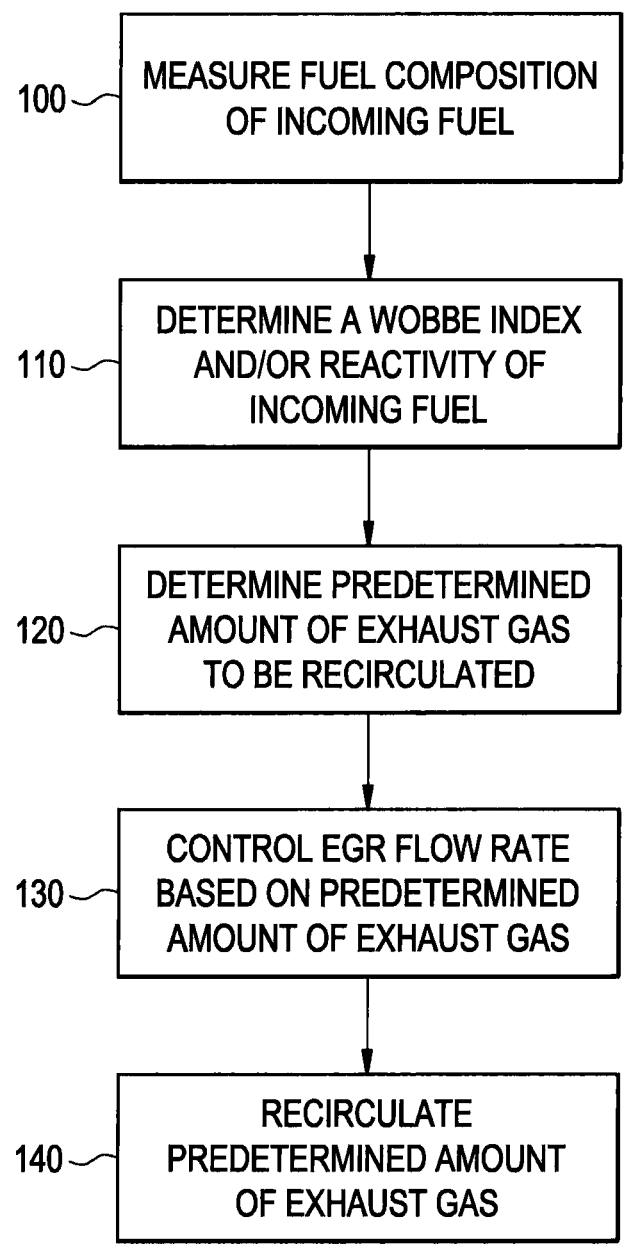
FIG. 7 is a flowchart illustrating an EGR control method that can be implemented within embodiments of the present invention.

FIG. 7 is a flowchart illustrating an EGR control method that can be implemented within embodiments of the present invention. At operation 100, fuel composition of incoming fuel is measured using a measuring unit. From operation 100, the process moves to operation 110, where a Wobbe Index and/or reactivity of the incoming fuel is determined based on the measured fuel composition. From operation 110, the process moves to operation 120 where a predetermined amount of exhaust gas to be recirculated is determined by a control unit based on the determined Wobbe Index and/or reactivity. From operation 120, the process moves to operation 130 where an EGR flow rate is controlled by the control unit, based on the predetermined amount of exhaust gas as determined. Then, from operation 130, the process moves to operation 140 where the predetermined amount of exhaust gas is then recirculated. According to another exemplary embodiment, at operation 100, the fuel composition of the incoming fuel may be measured in real-time. Therefore, at operation 120, the EGR flow rate may be varied in real-time based on the determined Wobbe Index and/or reactivity. Thus, the EGR flow rate may be varied in real-time, for example, by increasing the predetermined amount of exhaust gas to be recirculated, when a heating value of the determined Wobbe index is greater than a heating value of existing fuel in the system, decreasing the predetermined amount of exhaust gas to be recirculated when the heating value of the determined Wobbe index is less than the heating value of the existing fuel, and maintaining the predetermined amount of exhaust gas to be recirculated at a constant amount, when the heating value of the determined Wobbe index equals the heating value of the existing fuel.

According to an exemplary embodiment, at operation 120, the predetermined amount of exhaust gas to be recirculated may be selected, via a database of the control unit, based on the determined Wobbe index. Alternatively, the predetermined amount of exhaust gas to be recirculated may be determined by obtaining turbine loading information, and selecting the predetermined amount of exhaust gas to be recirculated based on the determined Wobbe index and the turbine loading information obtained.

According to the present invention, by measuring the fuel composition of incoming fuel, determining the Wobbe Index and/or reactivity of the incoming fuel and controlling an EGR flow rate based on the determined Wobbe index and/or reactivity, the present invention provides the advantage of optimizing the EGR flow rate for a given fuel, thereby reducing the amount of NOx produced during system operation. Thus, the EGR system according to exemplary embodiments of the present invention can accommodate changes in fuel type.

While the invention has been described with reference to exemplary embodiments, it will be understood by those skilled in the art that various changes may be made and equivalents maybe substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. An exhaust gas recirculation system comprising:
   a combustor;
   a compressor;
   an exhaust gas recirculation regulator operatively connectable to a turbomachine system, the exhaust gas regulator regulating a predetermined amount of exhaust gas to be recirculated, the predetermined amount of exhaust gas being provided to the compressor, and the predetermined amount of exhaust gas being sent to the combustor from the compressor,
   at least one measuring unit configured to measure fuel composition of incoming fuel, the incoming fuel being provided to the combustor separately from the predetermined amount of exhaust gas; and
   a control unit operatively connected to the exhaust gas recirculation regulator and the measuring unit, the control unit determining at least one of a Wobbe Index and reactivity of the incoming fuel based on the measured fuel composition and determining the predetermined amount of exhaust gas based on the at least one Wobbe Index and reactivity.

2. The exhaust gas recirculation system of claim 1, wherein the control unit comprises a database which comprises information including predetermined exhaust gas recirculation amounts for specified Wobbe indices of fuel, and the control unit selects a predetermined amount of exhaust gas to be recirculated based on the determined Wobbe index of the incoming fuel.

3. The exhaust gas recirculation system of claim 2, wherein the database is a lookup table.

4. The exhaust gas recirculation system of claim 2, wherein the control unit obtains turbine loading information and controls the exhaust gas recirculation regulator based on the determined Wobbe index and the turbine loading information obtained.

5. The exhaust gas recirculation system of claim 1, wherein the control unit determines the reactivity of the incoming fuel based on at least one of a flame speed, flammability limits and a chemical time of the incoming fuel, and determines the predetermined amount of exhaust gas to be recirculated based on the determined reactivity.

6. The exhaust gas recirculation system of claim 1, wherein the measuring unit measures the fuel composition of the incoming fuel in real-time, and transmits the measured fuel composition to the control unit, and the control unit determines the at least one Wobbe Index and reactivity of the incoming fuel based on the measured fuel composition and controls the exhaust gas recirculation regulator by varying an exhaust gas recirculation flow rate in real-time based on the at least one Wobbe index and reactivity.

7. The exhaust gas recirculation system of claim 6, wherein the control unit increases the predetermined amount of exhaust gas to be recirculated when a heating value of the determined Wobbe index is greater than a heating value of existing fuel of the turbomachine system, decreases the predetermined amount of exhaust gas to be recirculated when the heating value of the determined Wobbe index is less than the heating value of the existing fuel, and maintains the predetermined amount of exhaust gas to be recirculated at a constant amount, when the heating value of the determined Wobbe index equals the heating value of the existing fuel.

8. A turbomachine system comprising:
a compressor;
at least one combustor configured to receiving incoming fuel;
at least one turbine operatively connected to the at least one combustor; and
an exhaust gas recirculation system comprising:
an exhaust gas recirculation regulator operatively connected to the at least one turbine, the exhaust gas recirculation regulator directing a predetermined amount of exhaust gas from the at least one turbine to the compressor, the predetermined amount of exhaust gas being provided to the compressor, and the predetermined amount of exhaust gas being sent to the at least one combustor from the compressor,
at least one measuring unit configured to measure fuel composition of the incoming fuel at the at least one combustor, the incoming fuel being provided to the at least one combustor separately from the predetermined amount of exhaust gas, and
a control unit operatively connected to the exhaust gas recirculation regulator and the measuring unit, the control unit determining at least one of a Wobbe Index and reactivity of the incoming fuel based on the measured fuel composition and determining the predetermined amount of exhaust gas to be recirculated based on the at least one Wobbe index and reactivity.

9. The turbomachine system of claim 8, wherein the control unit obtains turbine loading information and controls the exhaust gas recirculation regulator based on the determined Wobbe index and the turbine loading information obtained.

10. The turbomachine system of claim 8, wherein the control unit comprises a database which includes information for predetermined exhaust gas recirculation amounts for specified Wobbe indices for fuel, and selects a predetermined amount of exhaust gas to be recirculated based on the determined Wobbe index of the incoming fuel.

11. The turbomachine system of claim 8, wherein the measuring unit measures the fuel composition of the incoming fuel in real-time, and transmits the measured fuel composition to the control unit, the control unit determines the Wobbe Index and/or reactivity of the incoming fuel based on the measured fuel composition and controls the exhaust gas recirculation regulator by varying an exhaust gas recirculation flow rate in real-time based on the determined Wobbe index and/or reactivity of the incoming fuel.

12. The turbomachine system of claim 8, wherein the compressor comprises a first compressor and a second compressor, wherein the second compressor compresses the recirculated predetermined amount of exhaust gas and the compressed recirculated predetermined amount of exhaust gas is mixed with compressed gas from the first compressor prior to being introduced into the at least one combustor.

13. The turbomachine system of claim 12, wherein the second compressor compresses the recirculated predetermined amount of exhaust gas after the recirculated predetermined amount of exhaust gas is cooled by a heat exchanger.

14. The turbomachine system of claim 8, wherein the at least one combustor comprises a first combustor and a second combustor, and the at least one turbine comprises a first turbine and a second turbine, wherein:
the second combustor receives exhaust gas from the first turbine and mixes the exhaust gas with incoming fuel and burns the mixture,
the second turbine is configured to be driven by the burned mixture, and
the measuring unit measures fuel composition of the incoming fuel sent to the first combustor and the second combustor.

15. The turbomachine system of claim 14, wherein the measuring unit comprises a first measuring unit and a second measuring unit, and the first measuring unit measures the fuel composition of the incoming fuel at the first combustor and the second measuring unit measures the fuel composition of the incoming fuel at the second combustor, and the fuel composition measured by the first measuring unit and the second measuring unit is sent to the control unit.

16. The turbomachine system of claim 8, wherein the at least one turbine comprises a first turbine and a second turbine, the second turbine receiving exhaust gas from the first turbine, and is configured to be driven by the exhaust gas received.

17. An exhaust gas recirculation control method, the method comprising:
measuring fuel composition of incoming fuel that is provided to a combustor;
determining at least one of a Wobbe Index and reactivity of the incoming fuel based on the measured fuel composition;
determining a predetermined amount of exhaust gas to be recirculated based on the determined at least one Wobbe index and reactivity, the predetermined exhaust gas being provided to the combustor separately from the incoming fuel;
controlling an exhaust gas recirculation flow rate based on the predetermined amount of exhaust gas; and
recirculating the predetermined amount of exhaust gas.

18. The exhaust gas recirculation control method of claim 17, wherein determining a predetermined amount of exhaust gas to be recirculated comprises:

selecting, via a database, a predetermined amount of exhaust gas to be recirculated based on the determined Wobbe index.

19. The exhaust gas recirculation control method of claim 18, wherein determining a predetermined amount of exhaust gas to be recirculated further comprises:
   obtaining turbine loading information; and
   selecting a predetermined amount of exhaust gas to be recirculated based on the determined Wobbe index and the turbine loading information obtained.

20. The exhaust gas recirculation control method of claim 17, wherein measuring fuel composition comprises measuring the fuel composition of the incoming fuel in real-time.

* * * * *